United States Patent Office 3,325,345
Patented June 13, 1967

3,325,345
PROCESS OF FORMING WATER-LAID PRODUCTS FROM CELLULOSIC PULP CONTAINING POLYMERIC THERMOPLASTIC PARTICLES
Shibley A. Hider, Toledo, Ohio, assignor to Owens-Illinois, Inc., a corporation of Ohio
No Drawing. Filed Feb. 21, 1966, Ser. No. 528,831
8 Claims. (Cl. 162—169)

This application is a continuation-in-part of application Ser. No. 487,082, filed Sept. 13, 1965, now abandoned, which, in turn, was a continuation-in-part of application Ser. No. 309,873, filed Sept. 18, 1963, now abandoned.

The present invention relates to cellulosic-thermoplastic compositions. In particular, this invention relates to substantially homogeneous compositions of cellulosic fibers and particulate thermoplastics such as slurries of homogeneous cellulosic fiber-thermoplastic mixtures in liquid media, homogeneous fiber-thermoplastic mixtures prepared by removing the liquid phase from such slurries, and fused cellulosic-thermoplastic materials obtained by forming these fiber-thermoplastic mixtures by means of heat and/or pressure.

Homogeneous mixtures of fibrous cellulosic materials and thermoplastics are useful because they can be formed into products which possess advantageous properties imparted by each constituent. Materials of this type are particularly useful for the formation of containers for use in environments where additional strength and moisture resistance are advantageous. Such mixtures have in the past been prepared by a variety of procedures, including kneading the fibrous component into a plastic which is in a gummy, resinous condition (British 505,578); preparing an aqueous solution or colloidal suspension of the plastic in admixture with cellulosic fibers, and causing the plastic to coagulate or precipitate on the fibers (U.S. 2,739,058 and U.S. 3,062,701); stabilizing slurries of the fibrous and cellulosic components by means of additives such as mixtures of potassium oleate and triethanolamine (U.S. 2,290,794); a cationic surfactant and a trivalent metal ion (U.S. 2,658,828); and a protective colloid (U.S. 2,373,615); or incorporating hydrophilic groups into the polymer chain itself (U.S. 2,964,445).

These processes have several disadvantages, particularly for the preparation of cellulosic-thermoplastic mixtures which contain more than a few percent by weight of a thermoplastic: the use of gummy or viscous liquid plastics makes subsequent separation from the liquid medium, e.g., by filtration, difficult. Processes which involve coagulation require relatively expensive materials as dispersants or coagulants, and batch-to-batch variation of materials necessitates skillful handling and careful regulation of additives. The problem of attaining a homogeneous admixture is particularly acute when the thermoplastic component is lyophobic to and less dense than the liquid medium used. For example, when particulate hydrocarbon resins are to be incorporated into cellulosic materials in an aqueous medium. However, such products as blends of wood pulp and polyethylene are commercially highly desirable, because of the low cost of the raw materials and the availability of a variety of techniques from the plastic and paper arts to form and mold the resultant pulp-thermoplastic compositions.

A recently developed process which allows preparation of wood pulp-polyethylene mixtures involves dispersion of essentially anhydrous pulp in an organic medium such as toluene. To this dispersion is added an olefin polymerization catalyst, an olefinic monomer is then introduced into the reaction mixture thus obtained, thereby causing polymer capsules to form around the cellulosic fibers, see French patents 1,224,368, 1,216,661 and 1,269,850; British 917,500 (1963); Canadian 665,421; South African 381/59; Australian 241,539, 239,111, 242,-412, 238,546 and 244,874; Italian 603,064 and 605,268; and U.S. 3,121,658 and 3,121,698. This encapsulation procedure allows formation of pulp-plastic compositions with widely varying proportions of these components. However, this process possesses the obvious disadvantage of relatively expensive operation, and existing paper or plastic making facilities cannot be utilized.

In the above described encapsulation process, the pulp fibers are surrounded by a shell of plastic, therefore the resultant composition cannot be used directly to form a web or wet sheet of the type used in paper making. This is due to the fact that the fibers cannot form the cellulose-cellulose hydrogen bonds necessary to give the web coherence and strength. Accordingly, these encapsulated fibers cannot be formed into a sheet on standard paper making apparatus. The encapsulated fibers can be subjected to abrasive agitation to remove some of the encapsulating plastic. Paper formed from the material thus obtained performs poorly in such tests as tensile and tear strength, compared to similar paper products. This is due to the decreased ability of the fibers to achieve cohesion.

I have now discovered new homogeneous cellulosic-thermoplastic compositions that can be prepared without coagulating operations or the necessity for emulsifying agents in liquid media more dense than said thermoplastic, and to which the thermoplastic is lyophobic. This is accomplished by fibrillating the cellulosic component in the presence of the thermoplastic component so as entrap thermoplastic component. In particular, the products of this invention have excellent tensile and tear properties, and can be readily prepared employing aqueous media and standard paper making machinery without substantial alteration of normal paper forming procedures.

The objects of the present invention are to produce substantially homogeneous cellulosic-thermoplastic compositions which can readily be formed into a sheet on standard paper making machinery. Likewise, objects of this invention include the formation of a homogeneous suspension of a cellulose fiber and a lyophobic particulate thermoplastic that has good paper forming properties as well as good physical properties.

According to the present invention, homogeneous cellulosic-thermoplastic compositions are produced by first preparing a fiber-particulate thermoplastic suspension. This suspension is then beaten or refined to cause fibrillation until the plastic particles are entrapped in the cellulose fibers. The resulting mixture is formed into a web, dried and a finished article is produced by the addition of heat and/or pressure. The beating of the pulp-particulate thermoplastic mixture generally decreases the TAPPI freeness of said mixture from about 25 ml. to about 125 ml. Likewise, it could be stated that the cellulose fibers are fibrillated to a degree to entrap the particulate thermoplastic material so that when a slurry is formed, the cellulose fibers and particulate thermoplastic do not separate but instead form a homogeneous slurry. Since separation is not effected, conventional paper making apparatus can be used to form wet and finished sheets.

Liquid media which can be used in accordance with this invention include for example, hydrocarbons such as benzene, toluene, and heptane; mildly polar substances, for example, ethers such as ethyl ether and tetrahydrofuran; ketones such as 2-butanone; and highly polar solvents, for example hydroxy compounds such as water, methanol, and ethanol. Although convenience determined by routine test will usually establish the preferred medium in a particular application, the only substantial limitation on the medium is that it must not decompose or completely dissolve the cellulosic or the thermoplastic component under the conditions selected. Non-aqueous media which meet this requirement are suitable, but aqueous media have practical advantages because of their lower cost and customary use in the art for paper-making processes.

Any cellulosic material susceptible of fibrillation is applicable in the practice of the present invention, including wood cellulose and pulps derived from hardwoods, softwoods and woody annual plants such as balsam fir, eastern hemlock, jack pine, eastern white pine, red pine, black spruce, red spruce, white spruce, tamarack, cyprus, quaking aspen, American beech, paper birch, yellow birch, eastern cottonwood, sugar maple, silver maple, yellow poplar, black cherry, white oak, bagasse, hemp, cotton and jute; mixtures of cellulosic materials can also be used. No special prior refining is necessary for the pulps to be used in the practice of the present invention. The pulp-particulate thermoplastic mixture can contain from about 10 to about 90 weight percent pulp. A more preferred range for pulp concentration is from about 40 to about 60 weight percent with a most preferred percentage being 50 weight percent.

Modified pulps, including those treated with thermosetting resins such as urea-formaldehyde resins, melamine-formaldehyde resins, hydrolyzed and condensed methyl and phenyl triethoxysilane and copolymers of methyl and phenyl triethoxysilane are also applicable in the process of this invention, provided the treatment involved does not destroy their susceptibility to fibrillation. Modified pulps of this type are particularly useful in the manufacture of cellulosic-plastic compositions that have superior wet strength, that is the stiff when wet properties are improved. This modifying treatment of the pulp can take place prior to the blending of the pulp with the thermoplastic or simultaneously with said blending of the pulp with the thermoplastic or simultaneously with said blending. The pulp can be modified by addition of from about 0.1 to about 20 weight percent of a thermoset resin. A more preferred range for the modifying resin is from about 0.1 to about 5 weight percent with a most preferred concentration being 1-2 weight percent.

The fiber thermoplastic mixture can contain from about 10 to about 90 weight percent of a particulate thermoplastic material. A more preferred fiber-thermoplastic mixture contains from about 40 to about 60 weight percent of a particulate thermoplastic material with a most preferred composition containing 50 weight percent of a particulate thermoplastic material. Examples of thermoplastics which are suited for use in this phase of the subject invention include both homopolymeric and copolymeric resins, such as (1) vinyl resins formed by the polymerization of vinyl halides or by the copolymerization of vinyl halides with unsaturated polymerizable compounds, e.g., vinyl esters, $\alpha,\beta$-unsaturated esters, $\alpha,\beta$-unsaturated ketones, $\alpha,\beta$-unsaturated aldehydes and unsaturated hydrocarbons such as butadienes and styrenes; (2) poly-$\alpha$-olefins, such as polyethylene, polypropylene, polybutylene, polyisoprene and the like, including copolymers of poly-$\alpha$-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including copolymers and terpolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) silicones such as dimethyl and methyl hydrogen polysiloxanes; (14) unsaturated polyesters; and (15) cellulose esters including the nitrate, acetate, propionate, etc. This list is not meant to be limiting or exhaustive but merely to illustrate the wide range of polymeric materials which may be employed in the present invention.

Preferred thermoplastic polymers adapted for use in this invention are generally of low polarity and density. Examples of these preferred polymers are hydrophobic polymers such as those derived from olefinic hydrocarbons having from one to twelve carbon atoms, homopolymers and copolymers of ethylene, propylene, 1-butene, nylon, styrene, vinyl chloride, polybutadiene and polyisoprene. However, the thermoplastic can be low density or high density, low molecular weight or high molecular weight, and low melting or high melting. The only requirement is that it be in solid, particulate form. Mixtures of polymers can also be used.

When the particle size is greater than that which will pass through a 40-mesh (U.S. Standard Series) sieve, homogeneity of the product is difficult to achieve because the relatively large thermoplastic particles cannot be trapped and held by the fibrillated cellulosic fibers in the slurry. When the thermoplastic particle size is less than that which will be retained by a 300-mesh sieve, an increasing percentage of the small particles is lost during product formation. Within the useful range 40 to 300 mesh, there is a preferred range of 100 to 200 mesh. This preferred range gives an especially homogeneous product which is easy to form with virtually no loss of the plastic during the process.

It is within the purview of this invention to add to the cellulosic-thermoplastic slurry compatible materials, i.e., materials which do not affect the basic and novel characteristics of the products of the invention. Among such materials are coloring agents, including dyes and pigments, fillers, and similar additives. The upper limit of the quantity of additives is usually about ten weight percent of the product.

The texture of the finished product can be improved by the addition of one or more finely divided filler materials. These filler materials generally aid in the dispersion of the pulp and as such permit a uniform flow of the thermoplastic resin about the cellulosic component during shaping and molding. Examples of suitable fillers which are adapted for use in this invention include titanium dioxide, clay, asbestos, kraft lignin, glass fibers, glass powder, etc. Up to 10 weight percent of filler can be added to the cellulosic-thermoplastic mixture as based on the final product. These filler additions can be added prior to the beating of the cellulose-thermoplastic mixture, during the beating step or after said beating step.

The addition of tetrabutyl titanate to the pulp-thermoplastic compositions of this invention is particularly desirable. When small percentages of tetrabutyl titanate are added it has been found that there is a marked increase in the ring crush, tear, tensile and Mullen strength both dry and after water immersion. From about 0.01 to about 5 weight percent of tetrabutyl titanate can be added to the pulp-thermoplastic composition. A more preferred range for this addition is from about 0.01 to about 2 weight percent with a most preferred addition being 1 weight percent. The tetrabutyl titanate may be added at any time before the final fusion. The addition of tetrabutyl titanate to compositions of the subject type is discussed in U.S. Ser. No. 455,945, filed May 14, 1965, having a common assignee.

Because the superior properties of the product of this invention are the result of fibrillation and thereby entrapment of the particulate thermoplastic material, a discussion of fibrillation is thought to be in order. Fibrillation is the name applied to microscopic changes in cellulosic fibers which occur during beating or refining; these changes are regarded as responsible for the vastly improved paper-forming properties (coherence and softness) of beaten fibers as compared with those of unbeaten fibers. Fibrillation was considered essentially a chemical process, i.e., one which involved making and breaking covalent and/or ionic bonds, until publication of the currently accepted theory by Strachan, beginning at Paper Maker's Assoc., Great Britain and Ireland 6, 139 (1926). By this viewpoint, cellulose molecules are regarded as linear beta-1,4-glucosidic polymers with little branching; in wood they are organized into groups (crystallites), which further associate to form thread-like fibrillae and fibrils. Fibrillae are not visible in an optical microscope, but some are visible in an electron microscope. Fibrils are larger; they can be made visible in an optical microscope by silvering, and they are generally visible in an electron microscope. Fibrils and fibrillae are further associated to form wood fibers. The forces which maintain cellulose molecules in these levels of organization are believed to be mainly Van der Waals forces and hydrogen bonding, which are individually weak but aggregate to high strength. When celluosic fibers are mixed with water, the fibers imbibe water and swell. Suitable agitation of the swelled fibers first causes small fibrillae to be raised on the fiber surfaces; continued agitation causes internal fibrillation, or longitudinal separation of interior fibrils; and finally external fibrillation occurs, in which surface fibrils spirally unwind from the fiber. These changes can be largely successive or concurrent, depending on particular beating or agitation conditions used. Internal fibrillation is believed to cause increased softness of beaten fibers, while enhanced coherence is attributed to external fibrillation. The requirement for fibrillating conditions to achieve the homogeneous compositions of the present invention is believed to derive from the ability of externally fibrillated fibers to trap thermoplastic particles of suitable size and hold them in substantially uniform dispersion.

Many variables determine conditions necessary to achieve substantial fibrillation with a given cellulosic fiber. Among the factors which influence fibrillation are the type of fiber used (softwood fibrillated more readily than hardwood); season of wood (springwood fibrillates more readily than summerwood); other materials in the slurry such as lignin, residual extractives, salts, and acids or bases; temperatures; and the type and duration of agitation used. Certain generalizations about the effect of beating on fibrillation can, however, be made; thus, prolonged light beating promotes external fibrillation, while hard beating favors internal fibrillation.

It will be apparent from the foregoing that not all types of agitation are applicable to provide the fibrillation necessary to obtain the products of the present invention. The degree of fibrillation suitable for the practice of this invention, however, can be defined in terms of the TAPPI freeness or Williams slowness. Specifications for the TAPPI test T227m–58, "Freeness of Pulp," as revised August 1958, are available from the Technical Association of the Pulp and Paper Industry, 360 Lexington Ave., New York 17, N.Y. The test is based on a measurement of rate of water drainage from a standardized pulp suspension through a perforated plate. The filtrate enters a funnel which is equipped with side and bottom orifices; the quantity of water which is collected from the side orifice is a measure of drainage rate, and this quantity in milliliters is TAPPI freeness. Tests for the present invention were made on a Williams precision freeness tester (Williams Apparatus Co., Watertown, N.Y.), which allows measure of drainage time rather than volume. Values from the two freeness tests are interconvertible by scales available from TAPPI at the address given above.

In terms of these tests, agitation suitable to provide fibrillation for the process of the present invention is that which provides a decrease of TAPPI freeness of value of the pulp alone of at least 25 ml. below the freeness value prior to treatment, and provides a final TAPPI freeness value of the pulp alone of from about 300 ml. to about 600 ml. A preferred range for the final value of the pulp is a TAPPI freeness of about 375 ml. to about 425 ml. It is to be noted that the freeness of the resulting mixture can also be measured. However, these values are usually slightly higher due to the effect of the particulate thermoplastic. When measuring the freeness of the composite mixture, the preferred final freeness falls within the range of from about 425 ml. to about 475 ml.

The fibrillation as described above is carried out on a slurry that is formed between a fiber-particulate thermoplastic mixture and a liquid medium as described above. As is mentioned, aqueous media are preferred for use in this invention. The slurry concentration during fibrillation can range from about 2 to about 8 weight percent. A more preferred concentration during fibrillation is from about 3 to about 6 percent, with a most preferred concentration being from about 4 to about 5 percent. It is obvious to one skilled in the art that the optimum slurry concentration depends on such factors as the type of pulp utilized, the thermoplastic utilized, the type of beater, etc.

Subsequent to fibrillation, the slurry is diluted to a concentration range of from about 0.01 to about 2 weight percent. A preferred range is from about 0.5 to about 1 weight percent. This dilution permits the formation of a wet sheet on a conventional paper-making machine such as a Fourdrinier.

Upon formation of the fibrillated fiber-particulate thermoplastic mixture as described above, said mixture is fed directly into a conventional paper-making machine such as a Fourdrinier machine. The coating of particulate thermoplastic on the fibrillated fibers is such that it is still possible to form fiber-to-fiber contact. Because of this fiber-to-fiber contact, a wet sheet of suitable strength to allow the use of a conventional paper making machine can be formed. The wet sheet upon formation can be dried with the dryers that are used to dry conventional paper. It is recognized by one skilled in the art, the temperature of the dryers and feed speed must be adjusted to cause the drying of the wet sheet. Upon drying, the sheet is formed into a finished product by the addition of heat and/or pressure.

It is to be noted that upon production of the finished fused material of this invention, said material is in sheet form. This sheet can then be corrugated, heat sealed, sealed with adhesives, formed into a container, etc. Likewise, the unfused pulp-thermoplastic mixture after drainage, can be fused into any shaped article by addition of heat and/or pressure.

The following examples will illustrate the invention. These examples are given for the purpose of illustration and not for the purpose of limiting this invention.

EXAMPLES 1 TO 36 FUSED HAND SHEETS

The data for these examples are listed in Tables I to V. In each case, the pulp and particulate thermoplastic were mixed together and added to the slurry media. The slurry was then agitated in either a Mead refiner or an Osterizer until the pulp fibers were fibrillated and the particulate thermoplastic material entrapped in the fibrillated fibers. Hand sheets were then prepared in a conventional manner. The hand sheets were then fused by the addition of heat and/or pressure, on a Carver press. The fusing temperature was from about 250 to about 400° F., at a pressure of from about 50 to about 1000 p.s.i.g., for a period of time of from about 5 to about 120 seconds. The basis weight for all hand sheets is adjusted to a thickness of 15 mils.

The TAPPI freeness is given in milliliters and was determined by TAPPI test T227m–58. The ring crust tests were conducted according to standard Ring Crush Test, ASTM D1164–60, and were conducted at 73° F.

at a testing values for the ring crush test are given in pounds. The tensile strength values are likewise given in pounds and were carried out at 73° F. at a 50 percent relative humidity. The wet values were determined after immersion in water for one hour. Standard Tensile Test, ASTM D1708-59T was utilized. The tear value tests were carried out at 73° F. at 50 percent relative humidity. The tear values are given in grams per 16 sheets. All tear tests being carried out as per Tear Test, ASTM D689-44. In all cases, the percentages given are by weight.

*Legend*

| | |
|---|---|
| LDPE | Low density polyethylene. |
| HDPE | High density polyethylene. |
| PVC | Polyvinyl chloride. |
| PE | Polyethylene. |
| MD | Machine direction. |
| CD | Cross direction. |
| MI | Melt index. |
| Den. | Density. |
| 73/50 | 73° F., 50% relative humidity. |
| BW | Basis weight. |

TABLE I

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 1 | Semi Chemical Hardwood. | 100 | 530 | | | | $H_2O$ | 4-5 | .5-2 | 480 |
| 2 | Pine Kraft | 100 | 530 | | | | $H_2O$ | 4-5 | .5-2 | 475 |
| 3 | Groundwood | 100 | 125 | | | | $H_2O$ | 4-5 | .5-2 | 100 |
| 4 | | | | LDPE; M.I., .2; Den., .916 | 100 | 50 | | | | |
| 5 | | | | HDPE; M.I., .2; Den., .960 | 100 | 50 | | | | |
| 6 | | | | Poly-propylene; M.I., 70 | 100 | 50 | | | | |
| 7 | Pine Kraft | 70 | 530 | LDPE; M.I., .2; Den., .916 | 30 | 50 | $H_2O$ | 4-5 | .5-2 | 460 |
| 8 | do | 60 | 545 | LDPE; M.I., .2; Den., .916 | 40 | 50 | $H_2O$ | 4-5 | .5-2 | 473 |

| No. | Additive | Percent Additive | Sheet B.W./15 mils. | Ring Crush 73/50 | Ring Crush 1 hr. soak | Tensile 73/50 | Tensile 1 hr. soak | Tear 73/50 |
|---|---|---|---|---|---|---|---|---|
| 1 | | | 33.6 | 44.4 | 0 | 18.3 | 0 | 52.0 |
| 2 | | | 53.2 | 90.7 | 4.3 | 57.7 | 0 | 372 |
| 3 | | | 22.5 | 29.0 | 0 | 7.8 | 0 | 29.0 |
| 4 | | | 59.5 | 39.5 | 39.5 | 17.5 | 17.5 | 860 |
| 5 | | | 70.2 | 150 | 150 | 29.8 | 29.8 | |
| 6 | | | 71.5 | 250 | 250 | 69.0 | 69.0 | |
| 7 | | | 61.2 | 112 | 22.4 | 70.3 | 23.4 | 416 |
| 8 | | | 60.9 | 100 | 25.0 | 58.2 | 20.0 | 400 |

TABLE II

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 9 | Pine Kraft | 50 | 560 | LDPE; M.I., .2; Den., .916 | 50 | 50 | $H_2O$ | 4-5 | .5-2 | 487 |
| 10 | do | 40 | 571 | LDPE; M.I., .2; Den., .916 | 60 | 50 | $H_2O$ | 4-5 | .5-2 | 501 |
| 11 | do | 30 | 583 | LDPE; M.I., .2; Den., .916 | 70 | 50 | $H_2O$ | 4-5 | .5-2 | 509 |
| 12 | do | 20 | 594 | LDPE; M.I., .2; Den., .916 | 80 | 50 | $H_2O$ | 4-5 | .5-2 | 531 |
| 13 | Neutral Semi Chemical Hardwood. | 60 | 550 | LDPE; M.I., .2; Den., .916 | 40 | 50 | $H_2O$ | 4-5 | .5-2 | 499 |
| 14 | do | 50 | 557 | LDPE; M.I., .2; Den., .916 | 50 | 50 | $H_2O$ | 4-5 | .5-2 | 505 |
| 15 | do | 40 | 569 | LDPE; M.I., .2; Den., .916 | 60 | 50 | $H_2O$ | 4-5 | .5-2 | 512 |

| No. | Additive | Percent Additive | Sheet B.W./15 mils | Ring Crush 73/50 | Ring Crush 1 hr. soak | Tensile 73/50 | Tensile 1 hr. soak | Tear 73/50 |
|---|---|---|---|---|---|---|---|---|
| 9 | | | 60.1 | 103 | 31.0 | 45.3 | 32.1 | 280 |
| 10 | | | 66.0 | 84.4 | 29.5 | 32.8 | 30.8 | 246 |
| 11 | | | 71.2 | 76.4 | 44.1 | 37.8 | 35.5 | 226 |
| 12 | | | 70.6 | 112 | 85.9 | 33.0 | 33.0 | 258 |
| 13 | | | 56.5 | 78.4 | 15.3 | 26.6 | 5.5 | 155 |
| 14 | | | 64.1 | 103 | 42.1 | 37.4 | 21.1 | 163 |
| 15 | | | 64.5 | 91.5 | 50.8 | 26.7 | 20.8 | 144 |

TABLE III

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 16 | Neutral Semi Chemical Hardwood | 30 | 579 | LDPE; M.I., .2; Den., .916 | 70 | 50 | $H_2O$ | 4-5 | .5-2 | 530 |
| 17 | Groundwood | 33.33 | 125 | HDPE; M.I., .2; Den., .960 | 66.66 | 40-200 | $H_2O$ | 4-5 | .5-2 | 110 |
| 18 | Pine Kraft | 33.33 | 550 | Ethylene-Butene; Den., 950 | 66.66 | 40-100 | $H_2O$ | 4-5 | .5-2 | 501 |
| 19 | do | 25 | 440 | Acrylonitrile Styrene; Den., 1.10 | 75 | 40-100 | $H_2O$ | 4-5 | .5-2 | 410 |
| 20 | do | 30 | 550 | PVC; Den., 1.66 | 70 | 40-100 | $H_2O$ | 4-5 | .5-2 | 503 |
| 21 | do | 16.7 | 440 | PVC; Den., 1.66 | 83.3 | 40-100 | $H_2O$ | 4-5 | .5-2 | 396 |
| 22 | Neutral Semi Chemical Hardwood | 14.3 | 360 | PVC; Den., 1.66 | 85.7 | 40-100 | $H_2O$ | 4-5 | .5-2 | 302 |

| No. | Additive | Percent Additive | Sheet B.W./15 mils | Ring Crush 73/50 | Ring Crush 1 hr. soak | Tensile 73/50 | Tensile 1 hr. soak | Tear 73/50 |
|---|---|---|---|---|---|---|---|---|
| 16 | | | 69.3 | 82.0 | 45.8 | 29.5 | 23.5 | 153 |
| 17 | | | 48.3 | 294 | 232 | 43.0 | 32.2 | 220 |
| 18 | | | 63.5 | 130 | 130 | 42.4 | 36.4 | 376 |
| 19 | | | 76.7 | 756 | 447 | 53.5 | 29.0 | 228 |
| 20 | | | 83.6 | 168 | 90.1 | 70.1 | 53.7 | 182 |
| 21 | | | 79.5 | 256 | 207 | 65.2 | 65.2 | 212 |
| 22 | | | 68.3 | 253 | 253 | 54.5 | 54.5 | |

TABLE IV

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 23 | Pine Kraft | 33.33 | 504 | Polypropylene; Den., .902 | 66.66 | 40-100 | $H_2O$ | 4-5 | .5-2 | 449 |
| 24 | do | 25 | 532 | do | 75 | 40-100 | $H_2O$ | 4-5 | .5-2 | 484 |
| 25 | do | 14.3 | 506 | do | 85.7 | 40-100 | $H_2O$ | 4-5 | .5-2 | 457 |
| 26 | do | 20 | 430 | HDPE; M.I., .2; Den., .960 | 75 | 40-300 | $H_2O$ | 4-5 | .5-2 | 381 |
| 27 | Neutral Semi Chemical Hardwood | 20 | 375 | HDPE; M.I., .2; Den., .960 | 75 | 40-300 | $H_2O$ | 4-5 | .5-2 | 326 |
| 28 | do | 10 | 454 | HDPE; M.I., .2; Den., .960 | 88 | 40-300 | $H_2O$ | 4-5 | .5-2 | 403 |
| 29 | Pine Kraft | 46.6 | 526 | HDPE; M.I., 14; Den., .960 | 46.7 | 40-300 | $H_2O$ | 4-5 | .5-2 | 481 |

| No. | Additive | Percent Additive | Sheet B.W./15 mils | Ring Crush 73/50 | Ring Crush 1 hr. soak | Tensile 73/50 | Tensile 1 hr. soak | Tear 73/50 |
|---|---|---|---|---|---|---|---|---|
| 23 | | | 65.6 | 236 | 201 | 59.5 | 58.1 | 187 |
| 24 | | | 73.5 | 286 | 254 | 60.0 | 60.0 | 249 |
| 25 | | | 69.4 | 405 | 405 | 53.1 | 53.1 | 240 |
| 26 | $TiO_2$ | 5 | 45.9 | 269 | 245 | 51.9 | 56.6 | 374 |
| 27 | $TiO_2$ | 5 | 74.7 | 266 | 288 | 53.5 | 48.1 | 296 |
| 28 | $TiO_2$ | 2 | 44.5 | 235 | 235 | 46.3 | 42.1 | 400 |
| 29 | Melamine formaldehyde | 6.7 | 49.8 | 208 | 81.6 | 83.6 | 70.0 | 350 |

TABLE V

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 30 | Pine Kraft | 41.5 | 521 | HDPE; M.I., 14; Den., .960 | 46.5 | 40-300 | $H_2O$ | 4-5 | .5-2 | 472 |
| 31 | do | 55.8 | 461 | HDPE; M.I., 14; Den., .960 | 37.2 | 40-300 | $H_2O$ | 4-5 | .5-2 | 409 |
| 32 | do | 29.6 | 482 | LDPE; M.I., 2; Den., .916 | 66.66 | 40-300 | $H_2O$ | 4-5 | .5-2 | 426 |
| 33 | α-Cellulose | 50 | | HDPE; M.I., 14; Den., .960 | 50 | 40-100 | $H_2O$ | 4-5 | .5-2 | |
| 34 | Pine Kraft | 50 | 530 | HDPE, 40%; M.I., 5; Den., .95; LDPE, 10%; M.I., 22; Den., .916 | 50 | 50 | $H_2O$ | 4-5 | .5-2 | 475 |
| 35 | do | 50 | 530 | HDPE, 40%; M.I., 5; Den., .95; PE Wax, 10% | 50 | 50 | $H_2O$ | 4-5 | .5-2 | 475 |
| 36 | do | 40 | 520 | Nylon | 60 | 60-100 | $H_2O$ | 4-5 | .5-1 | 480 |

| No. | Additive | Percent Additive | Sheet B.W./15 mils | Ring Crush 73/50 | Ring Crush 1 hr. soak | Tensile 73/50 | Tensile 1 hr. soak | Tear 73/50 |
|---|---|---|---|---|---|---|---|---|
| 30 | Phenol formaldehyde | 7.0 | 52.2 | 153 | 68.6 | 94.8 | 56.0 | 293 |
| 31 | do | 7.0 | 51.0 | 175 | 58.5 | 77.1 | 60.6 | 318 |
| 32 | Asbestos chrysotile | 3.7 | 51.8 | 114 | 49.0 | 47.4 | 35.0 | 257 |
| 33 | | | 44.5 | 269 | 179 | 26.9 | 26.0 | 196 |
| 34 | | | 67.0 | 138 | 44.0 | 54.0 | 32.0 | 390 |
| 35 | | | 66.5 | 130 | 41.8 | 40.7 | 19.3 | 394 |
| 36 | | | 77.0 | 182 | 67 | 96.0 | 48.0 | |

EXAMPLES 37 TO 39 UNFUSED HAND SHEETS

The data for these examples are listed in Tables VI and VII. In each case, the samples were prepared and tested as per the description given for Examples 1 to 36 except that upon formation, the sheets were not fused.

component and agitating the same in a Valley beater or a Southerland cone refiner, or both. Continuous sheets were then prepared by feeding the resulting homogeneous mixture through a standary Pusey and Jones 31-inch Fourdrinier paper machine. The resulting wet sheet was then

TABLE VI

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 37 | Pine Kraft | 50 | 540 | LDPE; M.I., 2; Den., .916 | 50 | 50 | Cellosolve | 4-5 | 1.5 | 500 |
| 38 | ...do... | 50 | 550 | LDPE; M.I., 2; Den., .916 | 50 | 50 | Dioxane | 4-5 | .4 | 525 |
| 39 | ...do... | 50 | 525 | LDPE; M.I., 2; Den., .916 | 50 | 50 | Ethanol | 4-5 | .45 | 490 |

TABLE VII

| No. | Additive | Percent Additive | Sheet B.W./15 mils | Ring Crush 73/50 | Ring Crush 1 hr. soak | Tensile 73/50 | Tensile 1 hr. soak | Tear 73/50 |
|---|---|---|---|---|---|---|---|---|
| 37 | | | 51.0 | 41.0 | 5.5 | 20 | | 260 |
| 38 | | | 41.0 | 52.0 | 6.5 | 25 | | 300 |
| 39 | | | 42.6 | 43.0 | 3.0 | 18 | | 248 |

EXAMPLES 40 TO 51 UNFUSED CONTINOUSLY PRODUCED SHEETS

The data for these examples are listed in Tables VIII and IX. The samples as tested were prepared by the addition of a pulp component to the particulate thermoplastic dried to a continuous finished sheet under conventional paper driers. All samples were tested as per the description given for Examples 1 to 36 above, except that Mullen or Bursting Strength of Paper test ASTM D774–46 was utilized.

TABLE VIII

| No. | Pulp | Percent Pulp | TAPPI Freeness | Thermoplastic | Percent Thermoplastic | Mesh Size Thermoplastic | Slurry Medium | Percent Fibrillation Slurry Concentration | Percent Wet Sheet Slurry Concentration |
|---|---|---|---|---|---|---|---|---|---|
| 40 | Pine Kraft | 60 | 533 | LDPE; M.I., 2; Den., .916 | 40 | 50 | $H_2O$ | 4-5 | .59 |
| 41 | ...do... | 50 | 486 | LDPE; M.I., 2; Den., .916 | 50 | 50 | $H_2O$ | 4-5 | .51 |
| 42 | ...do... | 40 | | LDPE; M.I., 2; Den., .916 | 60 | 50 | $H_2O$ | 4-5 | .40 |
| 43 | Semi Chemical Hardwood Pulp | 50 | | LDPE; M.I., 2; Den., .916 | 50 | 50 | $H_2O$ | 4.5 | |
| 44 | Pine Kraft | 42 | 544 | HDPE; M.I., 5; Den., .960 | 58 | 40-100 | $H_2O$ | 4-5 | .722 |
| 45 | ...do... | 42 | | HDPE; M.I., 14; Den., .960 | 58 | 40-100 | $H_2O$ | 4-5 | .715 |
| 46 | Bleached Hardwood Soda Pulp | 50 | | HDPE; M.I., 14; Den., .960 | 50 | 40-100 | $H_2O$ | 4-5 | .40 |

| No. | TAPPI Freeness after Fibrillation | Sheet B.W./15 mils | Mullen 73/50 | M.D. Tensile 73/50 | C.D. Tensile | N.D. Tear 73/50 |
|---|---|---|---|---|---|---|
| 40 | 468 | 46.7 | 37.7 | 34.4 | 12.9 | 198 |
| 41 | 464 | 41.8 | 21.9 | 23.8 | 9.5 | 123.2 |
| 42 | 590 | 41.0 | 9.5 | 11.6 | 4.5 | 83.9 |
| 43 | 410 | 39.9 | 21.2 | 26.6 | 12.4 | 59.8 |
| 44 | 515 | 49.7 | 12.9 | 14.7 | 6.1 | 112.4 |
| 45 | 497 | 48.4 | 9.34 | 11.7 | 5.2 | 92.3 |
| 46 | 563 | 48.5 | 4.9 | 8.2 | 3.9 | 34.0 |

TABLE IX

| No. | Pulp | Percent Pulp | TAPPI Freeness | Thermoplastic | Percent Thermoplastic | Mesh Size Thermoplastic | Slurry Medium | Percent Fibrillation Slurry Concentration | Percent Wet Sheet Slurry Concentration |
|---|---|---|---|---|---|---|---|---|---|
| 47 | Pine Kraft | 40 | 659 | LDPE; M.I., 5; Den., .916 | 60 | 50 | H₂O | 4-5 | .524 |
| 48 | {Kraft Pulp / Groundwood} | 24 / 16 | 570 | LDPE; M.I., 5; Den., .916 | 60 | 50 | H₂O | 4-5 | .780 |
| 49 | Pine Kraft | 40 | 616 | Polystyrene; Den., 1.05 | 40 | 40-100 | H₂O | 4-5 | .480 |
| 50 | do | 30 | 592 | LDPE; M.I.,—; Den., .916 | 70 | 50 | H₂O | 2-3 | .764 |
| 51 | do | 100 | 532 | | | | H₂O | 4-5 | .400 |

| No. | TAPPI Freeness after Fibrillation | Sheet B.W./15 mils | Mullen 73/50 | M.D. Tensile 73/50 | C.D. Tensile | N.D. Tear 73/50 |
|---|---|---|---|---|---|---|
| 47 | 587 | 40.3 | 10.2 | 12.1 | 4.6 | 87.5 |
| 48 | 570 | | | | | |
| 49 | 472 | 46.6 | 11.6 | 14.9 | 6.1 | 81.4 |
| 50 | 531 | 46.8 | 11.4 | 12.9 | 5.3 | 79.3 |
| 51 | 486 | 53.4 | 67.4 | 57.4 | 28.2 | 415.0 |

EXAMPLES 52 TO 63 FUSED CONTINUOUSLY PRODUCED SHEETS

The data for these examples are listed in Tables X and XI. The samples were prepared and tested as per the description given for Examples 40 to 51, except that the samples were fused on a Carver press.

TABLE X

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 52 | Pine Kraft | 60 | 533 | LDPE; M.I., 2; Den., .916 | 40 | 50 | H₂O | 4-5 | .59 | 468 |
| 53 | do | 50 | 486 | LDPE; M.I., 2; Den., .916 | 50 | 50 | H₂O | 4-5 | .51 | 464 |
| 54 | do | 40 | | LDPE; M.I., 2; Den., .916 | 60 | 50 | H₂O | 4-5 | .40 | 590 |
| 55 | Semi Chemical Hardwood | 50 | | LDPE; M.I., 2; Den., .916 | 50 | 50 | H₂O | 4-5 | | 410 |
| 56 | Pine Kraft | 42 | 544 | HDPE; M.I., 5; Den., .960 | 58 | 40-100 | H₂O | 7-8 | .722 | 515 |
| 57 | do | 42 | | HDPE; M.I., 14; Den., .960 | 58 | 40-100 | H₂O | 4-5 | .715 | 497 |
| 58 | Bleached Hardwood Soda Pulp | 50 | | HDPE; M.I., 14; Den., .960 | 50 | 40-100 | H₂O | 4-5 | .40 | 563 |

| No. | Sheet B.W./15 mils | Ring Crush 73/50 Dry M.D. | Ring Crush 73/50 Dry C.D. | Ring Crush Wet M.D. | Ring Crush Wet C.D. | Tear 73/50 Dry M.D. | Tear 73/50 Dry C.D. | Mullen Dry 73/50 | Mullen Wet | Tensile Dry M.D. | Tensile Dry C.D. | Tensile Wet M.D. | Tensile Wet C.D. |
|---|---|---|---|---|---|---|---|---|---|---|---|---|---|
| 52 | 62.5 | 115 | 77.1 | 42.4 | 39.2 | 400 | 435 | 105 | 69.5 | 59.8 | 42.4 | 19.5 | 13 |
| 53 | 69.3 | 112 | 92.5 | 39.4 | 28.8 | 315 | 388 | 135 | 82.5 | 102.0 | 39.2 | 51.6 | 24 |
| 54 | 63.5 | 81.6 | 53.5 | 21.4 | 17.4 | 323 | 386 | 84.4 | 71.0 | 61.7 | 27.7 | 31.4 | 13 |
| 55 | 59.4 | 91.0 | 71.9 | 14.3 | 9.9 | 155 | 168 | 65.0 | 55.7 | 51.6 | 27.6 | 8.6 | 5 |
| 56 | 63.8 | 88.2 | 81.2 | 46.7 | 44.1 | 254 | 367 | 97.0 | 90.0 | 89.7 | 34.1 | 54.6 | 23 |
| 57 | 61.4 | 90.0 | 76.7 | 47.9 | 42.9 | 282 | 330 | 94.0 | 84.1 | 80.5 | 33.0 | 54.0 | 24 |
| 58 | 69.5 | 156 | 149 | 70.4 | 70.4 | 242 | 243 | 86.9 | 77.5 | 72.7 | 34.8 | 37.5 | 19 |

TABLE XI

| No. | Pulp | Percent Pulp | TAPPI Freeness | Thermoplastic | Percent Thermoplastic | Mesh size Thermoplastic | Slurry Medium | Percent Fibrillation Slurry Concentration | Percent Wet Sheet Slurry Concentration | TAPPI Freeness after Fibrillation |
|---|---|---|---|---|---|---|---|---|---|---|
| 59 | Pine Kraft | 40 | 659 | LDPE; M.I., 5; Den., .916 | 50 | 50 | H₂O | 4-5 | .524 | 587 |
| 60 | | | | | | | | | | |
| 61 | Pine Kraft | 40 | 616 | Polystyrene; Den., 1.05 | 60 | 40-100 | H₂O | 4-5 | .486 | 472 |
| 62 | do | 30 | 592 | LDPE; M.I.,—; Den., .916 | 70 | 50 | H₂O | 4-5 | .764 | 531 |
| 63 | do | 100 | 532 | | | | H₂O | 4-5 | .400 | 486 |

| No. | Sheet B.W./15 mils | Ring Crush 73/50 Dry M.D. | Ring Crush 73/50 Dry C.D. | Ring Crush Wet M.D. | Ring Crush Wet C.D. | Tear 73/50 Dry M.D. | Tear 73/50 Dry C.D. | Mullen Dry 73/50 | Mullen Wet | Tensile Dry M.D. | Tensile Dry C.D. | Tensile Wet M.D. | Tensile Wet C.D. |
|---|---|---|---|---|---|---|---|---|---|---|---|---|---|
| 59 | 61.5 | 58.5 | 49.0 | 26.9 | 25.3 | 253 | 354 | 82.2 | 77.5 | 64.7 | 28.8 | 45.7 | 19.8 |
| 60 | | | | | | | | | | | | | |
| 61 | 68.8 | 292 | 273 | 127 | 137 | 223 | 231 | 57.7 | 89.4 | 101.5 | 48.0 | 58.4 | 26.9 |
| 62 | 60.6 | 58.5 | 41.1 | 19.0 | 8.7 | 194 | 253 | 69.5 | 71.1 | 56.3 | 23.7 | 38.0 | 15.7 |
| 63 | 38.6 | 75.5 | 52.5 | 2.9 | 2.4 | 312 | 404 | 74.0 | 21.4 | 64.3 | 26.6 | 0 | 0 |

What is claimed is:

1. A homogeneous slurry having a solid content of from about 0.01 to about 2 weight percent consisting essentially of from about ten (10) to about ninety (90) weight percent of a fibrillated pulp and from about ninety (90) to about ten (10) weight percent of a particulate synthetic polymeric thermoplastic, which will pass through a 40-mesh screen and be retained by a 300-mesh screen wherein the fibrillation of the pulp is carried out at a slurry concentration of from about 2 to about 8 weight percent and the slurry contains said particulate synthetic polymeric thermoplastic material, the freeness of the pulp being decreased from about 25 ml. to about 125 ml. to a final value of from about 300 ml. to about 600 ml. in accordance with TAPPI test T227m–58.

2. The product which is produced by the removal of the liquid slurry medium from the slurry of claim 1.

3. A fused finished article which is produced by removing the liquid slurry medium of the slurry of claim 1 and by the addition of heat and pressure to the resulting composition.

4. The homogeneous slurry of claim 1 consisting essentially of from about 60 to about 40 weight percent of a fibrillated pulp and from about 40 to about 60 weight percent of a synthetic particulate polymeric thermoplastic alpha olefin having from one to twelve carbon atoms, which will pass through a 40-mesh screen and be retained by a 100-mesh screen, wherein the fibrillation of the pulp is carried out at a slurry concentration of from about 3 to about 6 weight percent and the slurry contains said particulate polymeric thermoplastic alpha olefin, the freeness of the pulp being decreased from about 25 ml. to about 125 ml. to a final value of from about 375 ml. to about 425 ml. in accordance with TAPPI test T227m–58.

5. The homogeneous slurry of claim 1 consisting essentially of a slurry of from about 40 to about 60 weight percent of fibrillated wood pulps selected from the group consisting of pine kraft, groundwood, semichemical hardwood, bleached hardwood soda, α-cellulose, and mixtures of these, and from about 60 to about 40 weight percent of a synthetic particulate polymeric thermoplastic selected from the group consisting of polymers and copolymers of low density polyethylene, high density polyethylene, polypropylene, polystyrene, polyvinyl chloride, butene, nylon and acrylonitrile, which will pass through a 100-mesh screen and be retained by a 200-mesh screen, wherein the fibrillation of the pulp is carried out at a slurry concentration of from about 3 to about 6 weight percent and the slurry contains said particulate polymeric thermoplastic material, the freeness of the pulp being decreased from about 25 ml. to about 125 ml. to a final value of from about 375 to about 425 ml. in accordance with TAPPI test T227m–58.

6. The homogeneous slurry of claim 5 wherein the pulp utilized is pine kraft and the synthetic particulate polymeric thermoplastic material is polyethylene.

7. The homogeneous slurry of claim 5 wherein the pulp utilized is pine kraft and the synthetic particulate polymeric thermoplastic material is polyvinyl chloride.

8. A method of forming a pulp-thermoplastic article which comprises the steps of: forming a slurry containing from about 2 to about 8 weight percent of a composition comprising a synthetic particulate polymeric thermoplastic, which will pass through a 40-mesh and be retained by a 300-mesh screen and a fibrous cellulose material, refining this slurry containing said particulate polymeric thermoplastic material and fibrous cellulose material until the freeness of the fibrous cellulosic material is decreased by from about 25 to about 125 ml. to a final value of from about 300 to about 600 ml., in accordance with TAPPI test T227m–58, diluting this slurry to a concentration of from about 0.01 to about 2 weight percent forming a wet sheet from said slurry and applying heat and pressure to form a fused finished sheet.

References Cited
UNITED STATES PATENTS

| | | | |
|---|---|---|---|
| 1,919,697 | 7/1933 | Groff | 162—168 |
| 2,739,058 | 3/1956 | O'Flynn et al. | 162—169 |
| 2,757,115 | 7/1956 | Heritage | 162—10 |
| 3,157,566 | 11/1964 | Brafford | 162—183 X |
| 3,173,829 | 3/1965 | Thier et al. | 162—183 X |

FOREIGN PATENTS 505,578  5/1939  Great Britain.

S. LEON BASHORE, *Acting Primary Examiner.*